United States Patent [19]

Gilbert

[11] Patent Number: 5,449,132
[45] Date of Patent: Sep. 12, 1995

[54] PASSENGER SEAT REAR TRACK FITTING

[75] Inventor: Klay E. Gilbert, Lindsay, Tex.

[73] Assignee: Weber Aircraft, Inc., Gainsville, Tex.

[21] Appl. No.: 947,491

[22] Filed: Sep. 18, 1992

Related U.S. Application Data

[63] Continuation-in-part of Ser. No. 829,961, Feb. 3, 1992, Pat. No. 5,337,979.

[51] Int. Cl.⁶ ............................................. B64D 11/06
[52] U.S. Cl. .................................. 244/122 R; 410/105; 410/115; 410/77; 248/503.1
[58] Field of Search .............. 244/118.1, 118.6, 122 R; 410/101–105, 115, 77; 248/503.1

[56] References Cited

U.S. PATENT DOCUMENTS

| | | |
|---|---|---|
| 2,889,167 | 8/1959 | Elsner . |
| 3,189,313 | 6/1965 | Burns et al. . |
| 3,620,171 | 11/1971 | Brenia et al. . |
| 3,622,202 | 11/1971 | Brown . |
| 3,652,050 | 3/1972 | Marrujo et al. . |
| 3,677,195 | 7/1972 | Prete, Jr. . |
| 3,810,534 | 5/1974 | Prete, Jr. . |
| 3,847,344 | 11/1974 | Kulczycki et al. . |
| 4,026,218 | 5/1977 | Prete, Jr. et al. . |
| 4,062,298 | 12/1977 | Weik . |
| 4,109,891 | 8/1978 | Grendahl . |
| 4,114,947 | 9/1978 | Nelson . |
| 4,230,432 | 10/1980 | Howell .......................... 410/102 |
| 4,256,424 | 3/1981 | Knox et al. . |
| 4,396,175 | 8/1983 | Long et al. . |
| 4,493,470 | 1/1985 | Engel . |
| 4,496,271 | 1/1985 | Spinosa et al. ..................... 410/105 |
| 4,509,888 | 4/1985 | Sheek . |
| 4,688,843 | 8/1987 | Hall . |
| 4,708,549 | 11/1987 | Jensen . |
| 4,718,719 | 1/1988 | Brennan . |
| 4,771,969 | 9/1988 | Dowd . |
| 4,776,533 | 10/1988 | Sheek et al. . |
| 4,796,837 | 1/1989 | Dowd . |
| 4,911,381 | 3/1990 | Cannon et al. . |
| 5,058,829 | 10/1991 | Bentley . |
| 5,169,091 | 12/1992 | Beroth .......................... 244/118.6 |
| 5,178,346 | 1/1993 | Beroth . |

FOREIGN PATENT DOCUMENTS

| | | | |
|---|---|---|---|
| 0327990 | 8/1989 | European Pat. Off. | ......... 244/118.6 |
| 2556000 | 6/1977 | Germany . | |

Primary Examiner—Galen L. Barefoot
Attorney, Agent, or Firm—Crutsinger, Booth & Kanz

[57] ABSTRACT

A track fitting assembly for removably securing a seat to a generally channel-shaped track secured to the fuselage of an aircraft. The track fitting assembly includes a forged body member having spaced track lugs projecting laterally from a narrow finger portion. The body member has a socket which receives a threaded shear plunger adjusting screw. A head on the adjusting screw moves into the socket to indicate when the shear plunger is properly seated to lock the track lugs in the track.

1 Claim, 4 Drawing Sheets

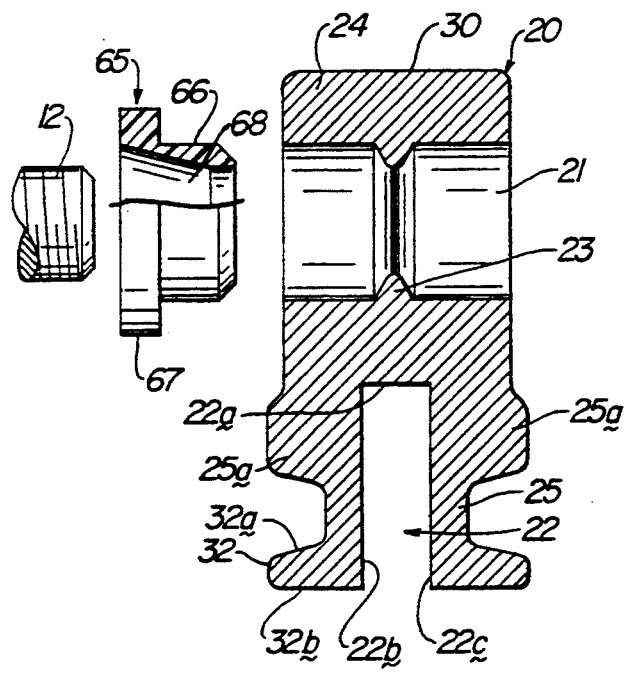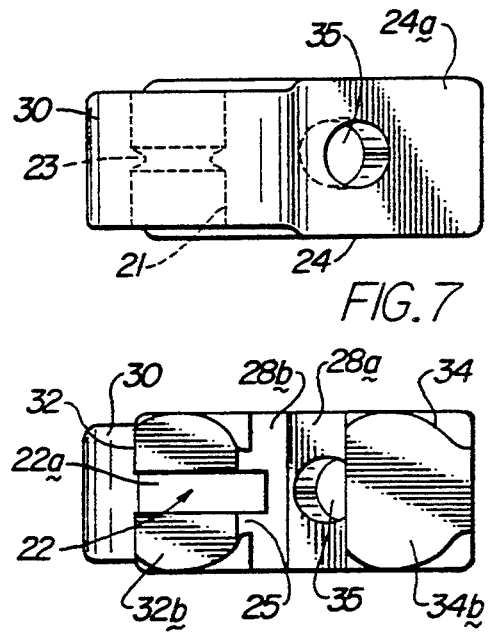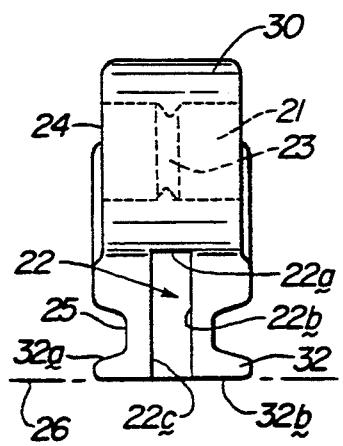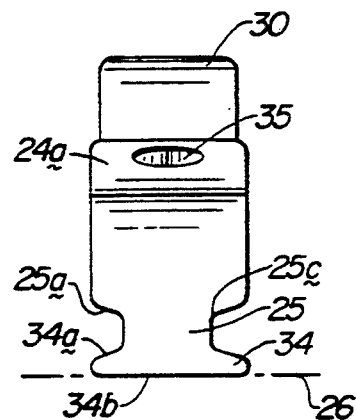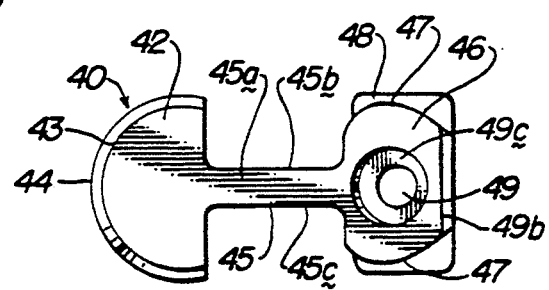

PASSENGER SEAT REAR TRACK FITTING

CROSS REFERENCE TO RELATED APPLICATIONS

This application is a continuation-in-part of application Ser. No. 07/829,961, filed Feb. 3, 1992 entitled "TRACK FITTING FOR AIRCRAFT SEATS", now U.S Pat. No. 5,337,979; the disclosure of which is incorporated herein by reference for all purposes.

TECHNICAL FIELD

The invention relates to an anti-rattle track fitting for securing a leg of a seat to a track mounted on the floor of an aircraft or other vehicle, the fitting having a visible indicator to confirm that the fitting is properly installed.

BACKGROUND OF INVENTION

The invention disclosed herein relates to improvements in track fittings of the type disclosed in Bentley U.S. Pat. No. 5,058,829, entitled "SEAT TRACK FITTING", which are commercially available from Weber Aircraft of Gainesville, Tex. Track fittings are employed for securing passenger seats in commercial and military aircraft to track rails in the floor of an aircraft. Track fittings vary in design due to the structural needs of the seat and the allowable strength of the aircraft.

Track rails in aircraft are generally "C" shaped channels and have holes bored every inch along the length of flanges to allow installation of the seats at any position and adjustment between seats at 1 inch increments along the track. The seat track fittings generally have track fitting lugs, arranged in pairs on the bottom of the fitting, which have an inverted "T" shaped cross section and have radii to allow them to be installed in the holes in the aircraft seat track rails.

The track fitting disclosed in Bentley U.S. Pat. No. 5,058,829 has a "C" shaped shear plunger mounted to slide vertically on the track fitting body. A separate "U" shaped anti-rattle device is moved by a screw to position ends of legs of the device in engagement with upper surfaces on the track to lift track fitting lugs into firm engagement with under surfaces of the track flanges.

Another fitting, disclosed in U.S. Pat. No. 4,771,969 entitled "LEG SET TRACK FITTING", is commercially available from Sabre Industries, Inc. of Burbank, Calif. The fitting has a generally circular shear element, which pivots about a horizontal axis relative to one end of a finger extending into the groove in a track such that the shear element is movable into openings in the track to prevent movement of the fitting longitudinally of the track. The fitting is also provided with a yoke configured to straddle the finger and extend into openings in the track to prevent sliding movement and to prevent rattling. This type of fitting, made of three stainless steel castings which require a 100% X-Ray inspection of the castings to satisfy Federal Aviation Regulations, is very expensive to manufacture and is very difficult to install.

An additional track fitting which is commercially available from Ancra Corporation of El Segundo, Calif. is disclosed in U.S. Pat. No. 4,256,424 entitled "RATTLE PROOF ANCHOR FITTING FOR SECURING LOADS TO A RETAINER TRACK". This fitting has a sliding shear plunger and a separate "U" shaped clamp member having flange surfaces which engage the track to prevent rattling.

Under certain conditions, track fittings of the type heretofore devised may be difficult to install because they must be in near perfect alignment with the seat track holes to engage properly. The fitting shear plunger must be snapped into the track hole and an adjustment screw must be turned to secure the anti-rattle device.

Some fittings utilize a single mechanism for the anti-rattle device and the shear plunger. However, this configuration is not the best, structurally, because the shear plunger is usually located between or aft of the fitting lug pairs. When the shear plunger is located between or aft of the fitting lug pairs, the track lip pairs that are forward of the shear plunger, react against both the shear plunger and one pair of fitting lug pairs in combination. Full track strength cannot be achieved in this configuration; however, this configuration is the easiest to access for installation and maintenance.

One track fitting which is commercially available uses a center plunger/antirattle device spring loaded in the up mode. The fitting is positioned over a hole in the track and a spring loaded adjuster is pushed down. The plunger drops down into the hole and the adjuster makes contact with mating threads in the fitting body. The adjuster is tightened to produce a snug fit and a small grub screw is tightened against the adjuster to prevent loosening. The small grub screw on the side of the fitting is a time consuming operation to be performed after the fitting is installed. This operation can be carelessly overlooked causing a non-secure fit of the track fitting.

If the shear plunger of track fittings heretofore devised is not located correctly, and the antirattle device is tightened, the track fitting can give a false appearance of a positive structural installation. The installation and removal of a seat from an aircraft is very time consuming, which is hampered by the fitting installation. Once the seat is installed in an aircraft, and the fitting is tightened, there exists no means of identification for confirming positive engagement between the track fitting and the track.

Other track fittings are disclosed in U.S. Pat. Nos. 3,189,313; 3,620,171; 3,652,050; 3,677,195; 3,810,534; 4,026,218; 4,062,298; 4,109,891; 4,114,947; 4,396,175; 4,493,470; 4,509,888; 4,688,843; 4,708,549; 4,718,719 and 4,911,381.

When a track fitting is removed from the track, the threaded adjusting screws may be bent or lost along with other fitting pieces. Further, the requirement that several tools be employed for installing or removing seats is undesirable.

A track fitting with a visual identification is needed to ensure positive track engagement and to permit proper installation and removal of seats much more quickly than can be accomplished using track fittings of the type heretofore devised.

SUMMARY OF INVENTION

The track fitting disclosed herein is employed for movably securing a seat to conventional, generally channel shaped tracks having an elongated central groove and spaced circular openings formed in horizontally extended flanges. The disclosed embodiment of the track fitting includes a forged or machined steel fitting body, a shear plunger assembly and a machined steel threaded adjuster which connects the shear plunger assembly to the track fitting body. The threaded adjuster has a colored head which moves into an internally threaded socket in the track fitting body when the shear plunger assembly is seated in the circular openings formed in the track flanges.

A screwdriver or other basic tool is used for installing and removing the track fitting which locks firmly in position and will not move from its locked position in the track when subjected to design loads.

The head on the threaded adjuster provides an indicator which clearly and reliably indicates whether or not the track fitting is properly locked in position despite adjacent installation of carpet, track covers, seat structure and other visible obstructions.

The track fitting assembly is configured to assure that seats are not incorrectly installed in a manner which would affect the load carrying capability of the track fitting.

The shear plunger assembly incorporates primary and secondary plunger heads which are received in openings in the track flanges such that torsional forces applied to the track fitting body is translated to force exerted on a first track lip segment in a first direction by the primary shear plunger and force exerted on a second track lip segment in a second direction by track lugs on the fitting body. This configuration prevents the application of compound loading on track lip segments which would prevent utilization of the full strength of the seat tracks.

DESCRIPTION OF DRAWINGS

Drawings of a preferred embodiment of the invention are annexed hereto so that the invention may be better and more fully understood, in which:

FIG. 6 is a cross-sectional view taken along line 6—6 of FIG. 3;

FIG. 7 is a top plan view of the track fitting body;

FIG. 8 is a bottom plan view thereof;

FIG. 9 is a front elevational view of the track fitting body;

FIG. 10 is a rear elevational view of the track fitting body;

FIG. 11 is a bottom plan view of the shear plunger assembly;

Numeral references are employed to designate like parts throughout the various figures of the drawings.

DESCRIPTION OF A PREFERRED EMBODIMENT

Figures 1, 2:
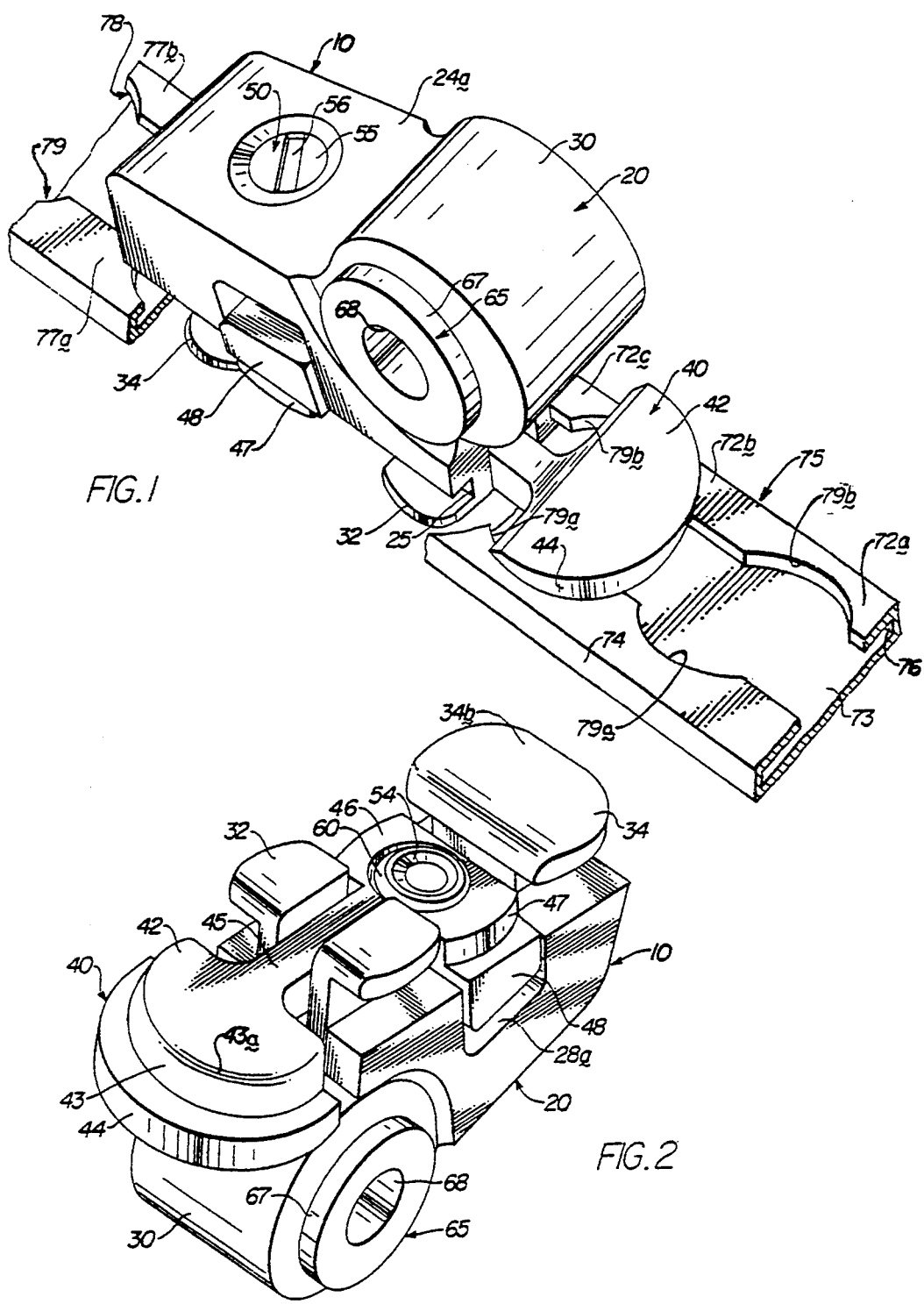
FIG. 1 is a perspective view of an aircraft seat track fitting.
FIG. 2 is a perspective view illustrating the bottom of the track fitting.

The track fitting assembly, generally designated by the numeral 10 in FIGS. 1 through 5 of the drawings, comprises a forged steel fitting body 20, a forged steel antirattle/shear plunger assembly 40, a machined steel threaded adjuster 50 and a flat washer 60.

The fitting body 20 and shear plunger 40 are preferably forged because the forging operation improves the quality of many metals. The coarse crystals of metal resulting from solidification in an ingot mold are kneaded and refined. Blow holes and layers of slag are consolidated and usually welded together. This results in a more ductile and stronger product than cast metal with much greater resistance to shock and to fatigue stresses. Hammer forging imparts a high degree of refinement on the surface of the work.

As best illustrated in FIGS. 6 and 8, body member 20 preferably comprises an enlarged upper boss portion 24 and a narrow elongated longitudinally extending lower finger portion 25 having a longitudinally extending slot 22 formed therein. A transversely extending channel 28 is formed in the lower portion of body 20 and intersects with slot 22, as will be hereinafter more fully explained.

Body 20 has a bolt receiving passage 21, as illustrated in FIG. 6, extending through a cylindrical connector portion 30 on boss portion 24 and a shoulder 23 extends into the passage 21. Shoulder 23 may be formed in the passage by drilling a first hole through body portion 24 having a diameter equal to the inside diameter of shoulder 23. Second concentric holes are then drilled, using a drill bit having a conical shaped end, through slightly less than one-half the thickness of boss portion 24.

As will be hereinafter more fully explained, two plastic bushings 65 are installed when the fitting is attached to the seat legs (not shown). The plastic bushings 65 are preferably identical, to prevent incorrect assembly.

The plastic bushings 65 are preferably injection molded by DuPont HYTREL or similar material, and insert on each side of the fitting body 20 to provide alignment and gimble about an attachment bolt 12. Each bushing 65 has a tubular portion 66 and a flange portion 67. A tapered passage 68 extending through each bushing 65 has an inside diameter substantially equal to the inside diameter of shoulder 23. The fitting body 20 can gimble plus or minus ten degrees about a vertical plane through the fitting body 20.

Bushings 65 provide a tapered passage through track fitting body 20 similar to that disclosed in Bentley U.S. Pat. No. 5,058,829, the disclosure of which is incorporated herein by reference in its entirety for all purposes.

As noted hereinbefore, the shape of the plastic bushings 65 allows them to be press fitted into each side of fitting body 20. The resilient plastic bushings 65 are preferably used on all "16G type" track fittings. As illustrated in FIGS. 8 and 9 of the drawing, slot 22 having an open bottom and open ends is bounded by surfaces 22a, 22b and 22c.

Figure 3:
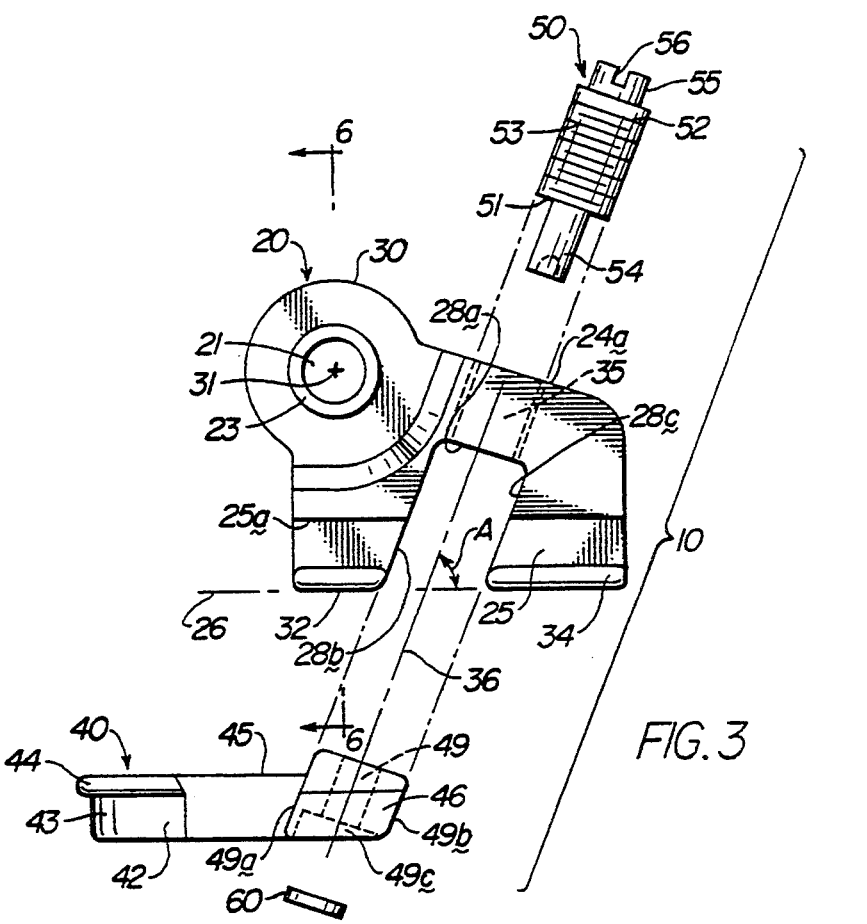
FIG. 3 is an exploded side elevational view of the track fitting.

As best illustrated in FIGS. 3 and 8 of the drawing, channel 28 is open at opposite ends and is bounded by surfaces 28a, 28b and 28c to form a receptacle of generally rectangular cross-section between track fitting lugs 32 and 34.

As best illustrated in FIGS. 3, 7 and 8 an internally threaded socket 35 extends through surfaces 24a and 28a of fitting body 20 and communicates with channel 28.

Shoulders 25a on boss portion 24 of fitting body 20 extend along upper edges of narrow finger 25. Filets 25c between shoulders 25a and finger portion 25 are preferably greater than 0.040 inch and preferably have a radius of at least 0.060 inch to reduce stress concentration.

Track fitting lugs 32 and 34 have upper surfaces 32a and 34a and lower surfaces 32b and 34b, respectively. Slot 22 extends through front track fitting lug 32 to form a bifurcated front track fitting lug 32 to accommodate the shear plunger assembly 40, as will be hereinafter more fully explained.

Lower surfaces 32b and 34b on track fitting lugs 32 and 34 preferably lie in a common plane 26. Referring to FIG. 3 of the drawing, it should be noted that surface 28a at the upper end of channel 28 is inclined at an angle relative to plane 26 while surfaces 28b and 28c bounding opposite sides of channel 28 are generally perpendicular to surface 28a and are inclined relative to plane 26. The axis 36 of threaded socket 35 is preferably parallel to surfaces 28b and 28c and is inclined relative to plane 26.

The axis 31 of passage 21 is parallel to plane 26 and extends through a generally cylindrical connector portion 30 formed on the end of track fitting body 20.

While connector portion 30 of the track fitting body is illustrated as a generally cylindrical lug in the illustrated embodiment of the drawing, it should be appreciated that it may be formed as a clevis having a slot formed therein to accommodate a lug on the leg of an aircraft seat.

Referring to FIGS. 2, 3 and 11 of the drawing, the numeral 40 generally designates a shear plunger having primary and secondary shear heads 42 and 46 formed on opposite ends thereof and a rigid connector bar 45 extending therebetween. The primary shear head 42 has a semi-circular front wall 43 and a semi-cylindrical rim 44 which extends outwardly from the upper edge of front wall 43.

The radius of curvature of front wall 43 is preferably slightly less than the radius of curvature of receptacles formed in track rails and rim 44 preferably has a radius of curvature slightly exceeding the radius of curvature of recesses formed in the track rails. The lower edge 43a of front wall 43 is preferably rounded or inclined to form a tapered guide surface to facilitate positioning primary shear head 42 in a receptacle in a track rail.

The secondary shear plunger head 46 has curved side surfaces 47 and front and rear surfaces 49a and 49b inclined at an angle "A" in a range of, for example, about 70 to 75 degrees relative to the bottom surface 45a of shear plunger assembly 40. When the secondary shear head 46 is positioned in channel 28 in track fitting body 20, the bottom surface 45a and plane 26 are substantially parallel.

Figure 5:
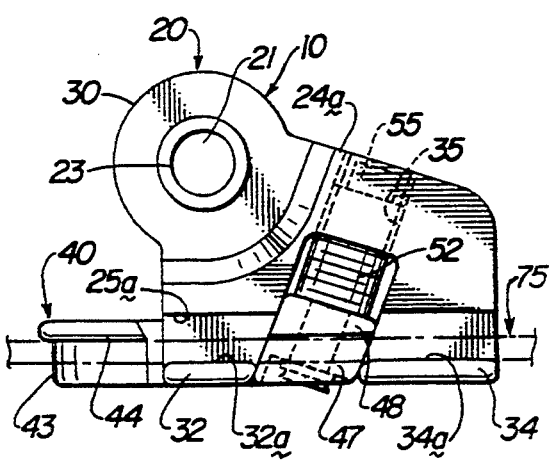
FIG. 5 is a side elevational view of a track fitting, the shear plunger assembly being illustrated in an extended position.

A passage 49 having a countersunk bore 49c is formed through the secondary shear head 46 and a flange 48 is formed on the upper end of secondary shear head 46 for engaging the upper surface of a track, as illustrated in FIG. 5 of the drawing, to pull upper surfaces 32a and 34a on track fitting lugs 32 and 34 into engagement with lower surfaces of track flange lips.

The connector bar portion 45 extends between the primary and secondary shear heads 42 and 46 and is configured to extend into slot 22 in track fitting body 20. With opposite sides 45b and 45c of connector bar 45 being positioned adjacent surfaces 22b and 22c adjacent opposite sides of slot 22 the primary shear head 42 is stabilized and horizontal forces are applied by the rear surface 49b on shear plunger assembly 40 to the shoulder 28c on track fitting body 20.

Figure 4:
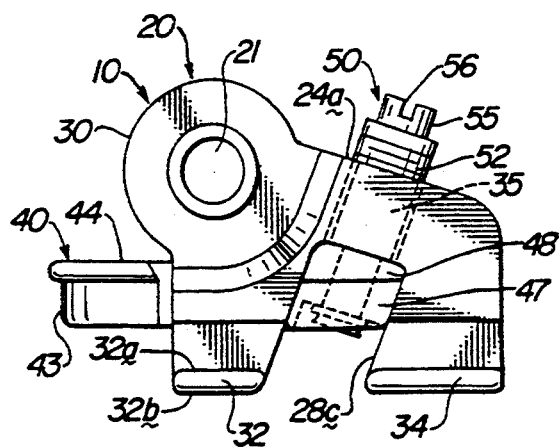
FIG. 4 is a side elevational view of the track fitting, the shear plunger assembly being illustrated in a retracted position.

As best illustrated in FIGS. 3, 4 and 5 of the drawing, an adjuster 50 comprises a screw having a threaded central portion 52, a stem 54 and a head 55. Stem 54 extends through passage 49 in secondary shear head 46 and through a washer 60. The lower end of stem 54 is then flared for rotatably securing adjuster 50 to shear plunger 40 to complete the assembly of the shear plunger assembly 40.

When the threaded central portion 52 of adjuster 50 is screwed into the threaded socket 35 formed in track fitting body 20, the head 55 is visible when the shear plunger assembly 40 is in the elevated position illustrated in FIG. 4 of the drawing. However, when adjuster 50 is rotated for moving shear plunger assembly 40 to the position illustrated in FIG. 5 of the drawing, the head 55 moves into the upper end of socket 35.

Head 55 on adjuster 50 and the body 20 of the track fitting assembly 10 are preferably different colors such that a visual inspection of head 55 clearly indicates whether or not shear plunger assembly 40 is in its fully extended position such that track fitting lugs 32 and 34 are captured under the track lips and shear heads 42 and 46 are seated in receptacles in the track.

Referring to FIG. 5 of the drawing, it should be readily apparent that the lower edge of the inclined front surface 49a on the secondary shear head 46 projects below and slightly forwardly of the rear edge of the track lip bounding the receptacle into which it extends such that a horizontal force applied to the front face 49a of secondary plunger head 46 tends to rotate the track fitting body 20 in a clockwise direction as illustrated in FIG. 5.

In the illustrated embodiment, the forged steel body 20 is provided with two lug pairs 32 and 34 and the forged steel anti-rattle shear plunger device 40 configured such that horizontal loads are primarily reacted by a track lip pair through the primary shear head 42 which sees no vertical loads.

The center of the plunger/antirattle device 40 is a secondary plunger 46 that can impose horizontal load against the tract lip pairs that are just forward. In this sense, the fitting 10 has multiple plungers. However, the secondary shear plunger 46 is configured such that it has a smaller area of contact with the track flange than the primary shear plunger 42. The secondary shear plunger 46 preferably carries less than about 25% of the shear load carried by primary shear head 42.

The fitting uses a single threaded adjuster 50 to raise and lower the shear plunger device 40. The threaded adjuster 50 has a slot 56 on the top for a standard screwdriver, but can have a hex recess, phillips head recess or other means of tool adjustment. The threaded adjuster is placed through the hole 49 in the shear plunger 40 and a washer 60 is placed in the counter bored end 49c of the shear plunger.

The end of the threaded adjuster 50 is flared or staked, holding the adjuster 50 on the shear plunger 40 while still allowing it to turn. Once the adjuster assembly is complete, it is assembled to the fitting body 20.

One of the threads 53 is deformed to produce a locking element to guard against looseness. The top of the threaded adjuster is painted red or chemically treated to provide a contrasting color to the fitting body.

The colored top of the adjuster will provide the inspector a visual means of identifying the positive security of the fitting in the aircraft track.

For the best utilization of the track strength, the primary shear plunger 40 should be placed directly forward of the track lip pairs. With this configuration the track lip pairs do not react to combined loads, in other words, horizontal loads are reacted by one pair of track lips and vertical loads are reacted by two different pairs of track lips.

Referring to FIG. 1 of the drawing, the conventional seat track 75 comprises a generally channel-shaped member bolted or otherwise secured to the fuselage of an aircraft. A typical track comprises a bottom wall 73 extending between spaced side walls 74 and 76 which have inwardly extending flange portions 77a and 77b spaced apart to form a groove 78 extending longitudinally of the track 75. Generally crescent shaped openings 79a and 79b are formed in flanges 77a and 77b to form a series of circular receptacles 79 spaced longitudinally of track 75 and having track lip segments 72a, 72b, 72c extending between the openings. The receptacles 79 formed by crescent shaped openings 79a and 79b are typically spaced on one inch (2.54 cm.) centers along the length of the track and generally have a diameter of approximately 1.00 inch (2.54 cm.).

Track 75 is of conventional design and forms no part of the invention except in combination with the seat leg and track fitting assembly 10 described herein. A portion of a typical track 75 is illustrated in FIG. 1 of the drawing to illustrate the cooperative relationship between track fittings 10 and the track 75. It will be appreciated that track section 75 has a typical cross-section and that other configurations may be employed, for example, tracks of the type disclosed in U.S. Pat. Nos. 3,652,050; 4,109,891; 4,114,947; 4,493,470; and 4,911,381.

It should be readily apparent that tracks 75 and track fitting assemblies 10 may be employed for mounting structure other than aircraft seats, such as cargo pallets or tie-down straps to the floor of aircraft, trucks, ships, buildings and other structures or for mounting seats in busses, trains and other vehicles.

The finger portion 25 of the body 20 of the track fitting assembly has a width which is equal to or less than the width of the groove 78, formed between flanges 77a and 77b of track 75, such that finger portion 25 is positionable in groove 78 to position the lower surfaces 32b and 34b on lugs 32 and 34 in sliding engagement with the upper surface of the bottom wall 73 of track 75.

The narrow finger portion 25 of each track fitting has a plurality of spaced track lugs 32 and 34 formed thereon, track lugs 32 and 34 being equally spaced and corresponding to the spacing of receptacles 79 formed by crescent-shaped recesses 79a and 79b formed in flanges 77a and 77b of track 75. Upper surfaces 32a and 34a of track lugs 32 and 34 are positioned adjacent the lower side of flanges 77a and 77b in track 75 when primary shear plunger head 42 and secondary head 46 are seated in spaced receptacles 79.

Plunger heads 42 and 46 are spaced apart a distance equal to the spacing of track lugs 32 and 34. However, the spacing between track lug 34 and plunger head 32 is one half the spacing between track lugs 32 and 34. Thus, when plunger heads 42 and 44 enter receptacles 79 formed by crescent-shaped recesses 79a and 79b, upper surfaces of track lugs 32 and 34 are positioned below the lip segments of flanges 77a and 77b extending between the crescent-shaped recesses 79a on flange 77a preventing vertical movement of track lugs 32 and 34 relative to track 75. Plunger heads 32 and 34 prevent movement of track fitting body 20 longitudinally of track 75 until plunger heads 42 and 44 are elevated from the position illustrated in FIG. 5 of the drawing.

Figure 12:
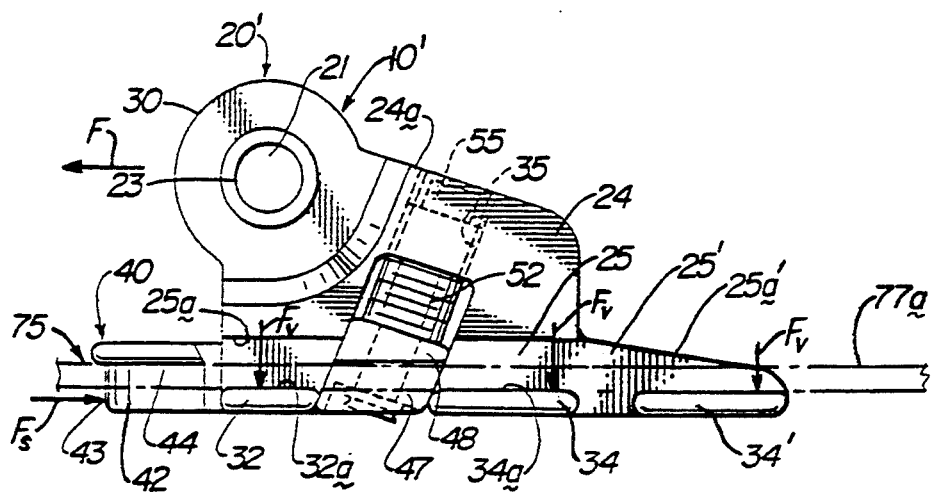
FIG. 12 is a side elevational view, similar to FIG. 5, of a second embodiment.
Figure 13:
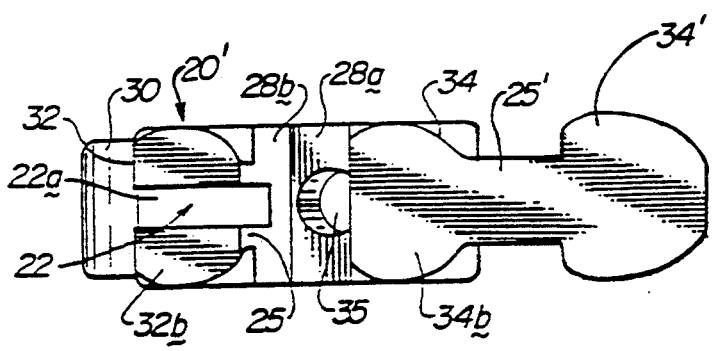
FIG. 13 is a bottom plan view of the second embodiment of the track fitting body.

A second embodiment 20' of the track fitting body is illustrated in FIGS. 12 and 13 of the drawing. The track fitting body 20' is substantially identical to track fitting body 20 except that a portion 25' of the narrow longitudinally extending lower finger 25 projects beyond the end of the enlarged upper boss portion 24 to support a third track fitting lug 34'.

As best illustrated in FIG. 12 of the drawing, the upper surface of portion 25' of the finger is inclined to form a tapered support for track fitting lug 34'. The upper surface 25a' of finger portion 25' drops below the upper surfaces of track flanges 77a and 77b so that it does not encroach on passenger space in the area immediately behind the rear leg of the seat upon which the track fitting assembly 10' is mounted.

From the foregoing, it should be readily apparent that in the event of a crash landing the seat leg (not shown) applies a force F to the cylindrical connector portion 30 of track fitting 10'. The track lip segments on track 75 in front of primary shear head 42 apply reactive shear force $F_s$ to the front wall 43 of primary shear head 42. Track lip segments rearwardly of primary shear head 42 apply generally vertical forces $F_v$ to track fitting lugs 32, 34 and 34'.

Track fitting lugs 32, 34 and 34' are positioned through spaced openings 79 in track 75 and moved longitudinally of the track for positioning the lugs below lip flange segments on the track. The threaded adjuster 50 cannot be screwed into boss portion 24 of body 20' to the position illustrated in FIG. 12 such that head 55 is concealed in threaded socket 35 unless the primary shear head 42 has been properly seated in one of the track fitting openings 79. Thus, if track fitting lugs 32, 34 and 34' are not visible and the head 55 on threaded adjuster screw 52 is concealed in threaded socket 35, this quickly and accurately indicates that the track fitting assembly 10' is properly installed.

Terms such as horizontal, vertical, upper and lower are used to describe the illustrated embodiments of the invention and should not be construed as limiting the scope of the invention.

There currently exists the need for a track fitting that is inexpensive, is simple, is easy to engage and disengage, uses simple tools to install, utilizes the full strength of the seat tracks, provides assurance the fitting is properly installed, and can withstand the loads produced by a 16G impact.

I claim:

1. A shear plunger assembly for use in combination with a track fitting body for removably securing a seat to a generally channel-shaped track having an elongated groove formed between a pair of flanges, each of the flanges having spaced openings positioned to form a series of spaced receptacles having flange lip segments between the receptacles, wherein the track fitting body has a finger portion which has a width less than the width of the groove formed in the track and a plurality of spaced track lugs projecting laterally from the finger portion, said shear plunger assembly comprising:

a primary shear head and a secondary shear head on a shear plunger assembly; and a connector portion on said shear plunger assembly between said primary and secondary shear heads, said secondary shear head having parallel front and rear surfaces inclined relative to a bottom surface at an angle in a range between 70 and 75°;

mounting means for mounting said primary and secondary shear heads on the track fitting body, said mounting means positioning said shear heads a distance relative to the track fittings lugs which is not equal to the distance between adjacent spaced receptacles in the track;

adjuster means connectable between said shear heads and the track fitting body for moving said shear heads relative to the track fitting body; and indicator means on said shear plunger assembly indicating whether or not said shear heads are positioned in a receptacle in the track flange to prevent movement of the track fitting lugs longitudinally of the track.

* * * * *